US006507661B1

(12) United States Patent
Roy

(10) Patent No.: US 6,507,661 B1
(45) Date of Patent: Jan. 14, 2003

(54) METHOD FOR ESTIMATING OPTICAL FLOW

(75) Inventor: Sebastien Roy, Kingston, NJ (US)

(73) Assignee: NEC Research Institute, Inc., Princeton, NJ (US)

(*) Notice: Subject to any disclaimer, the term of this patent is extended or adjusted under 35 U.S.C. 154(b) by 0 days.

(21) Appl. No.: 09/391,732

(22) Filed: Sep. 8, 1999

Related U.S. Application Data
(60) Provisional application No. 60/130,168, filed on Apr. 20, 1999.

(51) Int. Cl.[7] ................................................ G06K 9/00
(52) U.S. Cl. ...................................... 382/107; 382/103
(58) Field of Search ................................ 382/107, 100, 382/293, 241, 302, 103, 238, 236, 199, 203, 276, 230; 348/155, 699, 700, 586, 625, 620

(56) References Cited

U.S. PATENT DOCUMENTS

| | | | | |
|---|---|---|---|---|
| 5,680,487 A | * | 10/1997 | Markandey | 382/291 |
| 5,684,887 A | * | 11/1997 | Lee et al. | 382/107 |
| 5,751,838 A | * | 5/1998 | Cox et al. | 382/107 |

OTHER PUBLICATIONS

Barron, J.L. et al., "Performance of Optical Flow Techniques", *Int. J. Computer Vision*, 2(1): 43–77, 1994.
Horn, K. et al., "Determining Optical Flow", *Artificial Intelligence*, 17:185–203, 1981.
Nagel, H.H., "On the Estimation of Optical Flow: Relations Between Different Approaches and Some New Results", *Artificial Intelligence*, 33:299–324, 1987.
Anandan, P., "A Computational Framework and an Algorithm for the Measurement of Structure from Motion", *Int. J. Computer Vision*, 2:283–310, 1989.
Lucas, B.D. et al., "An Interative Image Registration Technique with an Application to Stereo Vision", In *DARPA IU Workshop*, pp. 121–130, 1981.
Srinivasan, S et al., "Optical Flow Using Overlapped Basis Functions for Solving Global Motion Problems", in *Proc. European Conference on Computer Vision*, pp. 288–304, Freiburg, Germany, 1998.
Roy, S. et al., "A Maximum–Flow Formulation of the n–camera Stereo Correspondence Probles", In *International Conference on Computer Vision*, pp. 492–499, Mumbai, India 1998.
Ishikawa, H. et al., "Occlusions, Discontinuities, and Epipolar Lines in Stereo". In *Proc. European Conference on Computer Vision*, pp. 232–237, Freiburg, Germany, 1998.
Boykov, Y. et al., "Markov Random Fields with Efficient Approximations" In *Proc. of IEEE Conference on Computer Vision and Pattern Recognition*, pp. 648–655, 1998.
Simoncelli, E.P. et al., "Probability Distributions of Optical Flow", In *Proc. of IEEE Conference on Computer Vision and Pattern Recognition*, pp. 310–315, 1991.

* cited by examiner

*Primary Examiner*—Leo Boudreau
*Assistant Examiner*—Seyed Azarian
(74) *Attorney, Agent, or Firm*—Andrew G. Isztwan

(57) ABSTRACT

A method for estimating the optical flow between a plurality of images is provided. The method includes obtaining a motion orientation component and a motion magnitude component. Determining the motion orientation component includes creating, a first graph using spatio-temporal derivatives of the plurality of images, solving for a first maximum-flow in the first graph to thereby obtain a first minimum-cut therefrom, and computing the motion orientation component from the first minimum-cut. Determining the motion magnitude component includes creating a second graph using spatio-temporal derivatives of the plurality of images and the motion orientation component, solving for a second maximum-flow in the second graph to thereby obtain a second minimum-cut therefrom, and computing the motion magnitude component from the second minimum-cut. The motion orientation component and the motion magnitude component together comprise the estimate of the optical flow between the plurality of images. The method properly models errors in the measurement of image derivatives while enforcing a brightness constraint, and efficiently provides a globally optimal solution to the optical flow in the context of the model.

15 Claims, 9 Drawing Sheets

$p(\theta \mid I_d^\theta)$ rubic taxi

METHOD FOR ESTIMATING OPTICAL FLOW

CROSS-REFERENCE TO RELATED APPLICATION

This application claims the benefit of U.S. Provisional Application No. 60/130,168, filed Apr. 20, 1999.

FIELD OF THE INVENTION

The present invention relates to generally to the field of machine vision, and in particular to a method for efficiently estimating the optical flow between two or more images.

BACKGROUND OF THE INVENTION

Motion estimation is an important issue which arises in many different machine vision tasks, such as robotics (including navigation and obstacle avoidance), autonomous vehicles, medical image analysis (including nonrigid motion such as angiography), etc. When the motion between two or more generally sequential images is small, it is described by the optical flow defined as the two-dimensional motion field between two different views. The optical flow indicates objects in the image which are moving, where they are moving to and how fast.

Under a constant brightness assumption ("CBA"), the pixel motion can be constrained along a single dimension. However, since the flow at a pixel has two components (i.e. orientation (direction and angle) and magnitude (i.e. speed)), optical flow estimation is an inherently difficult problem. Consequently, several attempts have been made to address this problem.

Most prior art methods overcome this problem by "regularizing" the flow field, i.e. by enforcing some form of smoothness on the flow field. See K. Horn et al., "Determining Optical Flow," *Artificial Intelligence*, Vol. 17, pp. 185–203 (1981); H. Nagel et al., "On The Estimation Of Optical Flow: Relations Between Different Approaches And Some New Results," *Artificial Intelligence*, Vol. 33, pp. 299–324 (1987). The CBA can also be cast as an energy minimization, where the flow field is estimated by minimizing the least squares difference between two images. See P. Anandan, "A Computational Framework And An Algorithm For The Measurement Of Structure From Motion," *Int'l Journal of Computer Vision*, Vol. 2, pp. 283–310 (1989); A. Singh, *Optic Flow Computation: A Unified Perspective*, IEEE Computer Society Press (1992). Optical flow can also be computed by "intersecting" local brightness constraints over a small image patch. See B. Lucas et al., "An Iterative Image Registration Technique With An Application To Stereo Vision," *DARPA IU Workshop*, pp. 121–130 (1981). The smoothness problem can also be addressed by fitting a parametric global motion model. See S. Srinivasan et al., "Optical Flow Using Overlapped Basis Functions For Solving Global Motion Problems," *Proceedings of European Conference on Computer Vision*, Freiburg, Germany, pp. 288–304 (1998).

Many prior art estimation methods achieve a balance between the brightness constraint and smoothness by minimizing a cost function. Since they depend on iterative, non-linear techniques, these methods are not guaranteed to converge to the global minimum and thus give unsatisfactory results when they converge to a local minimum.

The method of the present invention overcomes the above limitations by formulating the problem of flow estimation as a labeling problem in a Markov Random Field ("MRF") framework. Thus, the present invention solves for the dense, non-parametric flow while preserving discontinuities in the flow field.

For certain classes of MRF's, the exact Maximum A Posteriori ("MAP") estimate can be obtained efficiently by a maximum flow computation on a graph. Being guaranteed to be optimal, this computation avoids the problem of local minima. For examples of some recent methods that use the MRF formulation and a graph-theoretic solution, see: S. Roy et al., "A Maximum-Flow Formulation Of The n-Camera Stereo Correspondence Problem," *Int'l Conference on Computer Vision*, Mumbai, India, pp. 492–499 (1998); U.S. patent application. Ser. No. 08/978,834, filed Nov. 26, 1997, by S. Roy entitled "Maximum Flow Method For Stereo Correspondence" (hereinafter referred to as "the '834 Application," and which is hereby incorporated herein by this reference); H. Ishikawa et al., "Occlusions, Discontinuities, and Epipolar Lines In Stereo," *Proceedings of European Conference on Computer Vision*, Freiburg, Germany, pp. 232–237 (1998); Y. Boykow et al., "Markov Random Fields With Efficient Approximations," *Proceedings of IEEE Conference on Computer Vision and Pattern Recognition*, pp. 648–655 (1998).

Another significant problem in flow estimation is the computation of image derivatives. Since the image is discretized in the spatial, temporal and intensity dimensions, the accuracy of the discrete computation of spatio-temporal derivatives is limited. This problem is partially addressed by sophisticated derivative filters. In practice, the derivatives are also corrupted due to deviations from the constant brightness assumption such as change of illumination, brightness scaling and specularities. Hence the brightness constraint should not be considered to be a "true" rigid constraint. To capture and account for this notion of uncertainty, the present invention casts the brightness constraint in a probabilistic framework. A related example of a probabilistic interpretation of optical flow is described in an article by E. Simoncelli et al. entitled "Probability Distributions of Optical Flow," in *Proceedings of IEEE Conference on Computer Vision and Pattern Recognition*, pp. 310–315 (1991), which overcomes some of the problems of non-probabilistic approaches but suffers in performance from an oversimplistic optical flow model which fails to account for nonlinear characteristics of optical flow probabilities and fails to properly account for errors in image derivatives.

What is needed is a method for estimating optical flow that properly models the errors in the measurement of image derivatives while enforcing the brightness constraint, and which also efficiently provides a globally optimal solution to the optical flow in the context of said model.

SUMMARY OF THE INVENTION

Generally speaking, in accordance with the invention, a method for estimating the optical flow between a plurality of images is provided. The method includes obtaining a motion orientation component and a motion magnitude component. Determining the motion orientation component includes creating a first graph using spatio-temporal derivatives of the plurality of images, solving for a first maximum-flow in the first graph to thereby obtain a first minimum-cut therefrom, and computing the motion orientation component from the first minimum-cut. Determining the motion magnitude component includes creating a second graph using spatio-temporal derivatives of the plurality of images and the motion orientation component, solving for a second maximum-flow in the second graph to thereby obtain a second minimum-cut therefrom, and computing the motion magnitude component from the second minimum-cut. The motion orientation component and the motion magnitude component together comprise the estimate of the optical flow between the plurality of images. The method properly models errors in the measurement of image derivatives while enforcing a brightness constraint, and efficiently provides a globally optimal solution to the optical flow in the context of the model.

Accordingly, an object of the invention is to provide a method for estimating optical flow which efficiently and accurately estimates the optical flow between a plurality of images.

Another object of the invention is to provide a method for estimating optical flow which properly models errors in the measurement of image derivative while enforcing a constant brightness assumption constraint.

A further object of the invention is to provide a method for estimating optical flow which efficiently provides a globally optimal solution to the optical flow in the context of its model.

Other objects of the present invention will become more readily apparent in light of the following description in conjunction with the accompanying drawings.

DETAILED DESCRIPTION OF THE PREFERRED EMBODIMENTS

Before describing the invention in detail, the problem of modeling the errors in image derivatives while enforcing the brightness constraint will be explained and formulated to enhance understanding of the present invention.

A. Problem Formulation

The brightness constraint is derived assuming the constancy of image brightness of a pixel. As a result, the total derivative of the intensity of a pixel with respect to the spatio-temporal coordinates is zero. Thus:

$$I(x, y, t) = I(x + v_x, y + v_y t + 1) \quad (1)$$

$$\Rightarrow \left(\frac{\partial}{\partial x} + \frac{\partial}{\partial y} + \frac{\partial}{\partial t}\right) I = 0$$

$$\Rightarrow v_x I_x + v_y I_y + I_t = 0$$

where $I_x$, $I_y$ and $I_t$ are the spatio-temporal image derivatives, and $v_x$, $v_y$ are the components of flow along the x and y directions. This constraint describes the equation of a line (see FIGS. 1A and 1B). As previously mentioned, the brightness constraint has to be relaxed due to the inherent uncertainty in image derivatives. As will be discussed below, using simple and intuitive priors (i.e. a priori probability distributions, representing knowledge known before solving the problem) in a Bayesian framework can yield useful models of the CBA.

For convenience, the following notation will be used herein. The spatial derivatives $I_x$, $I_y$ are denoted as $\nabla I$ and the spatio-temporal derivatives $I_x$, $I_y$, $I_t$ are denoted as $I_d$. These image derivatives can be determined in any manner, and many algorithms for doing so are well-known in the art. The flow at a given pixel is denoted as v, i.e. $v=[v_x, v_y, 1]$.

Figure 1A:
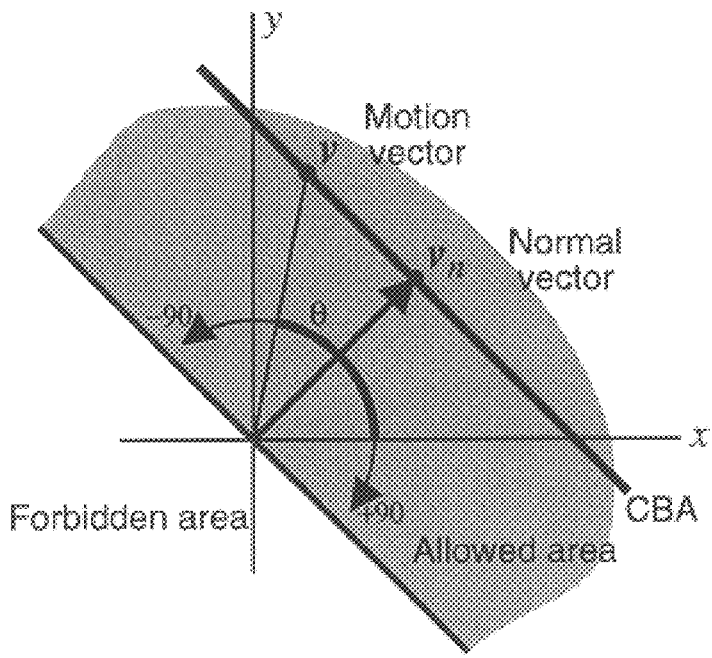
FIG. 1A is a diagram illustrating the brightness constraint on optical flow estimation, in which the shaded "allowed" area represents all possible motions for a normal vector $v_n$.
Figure 1B:
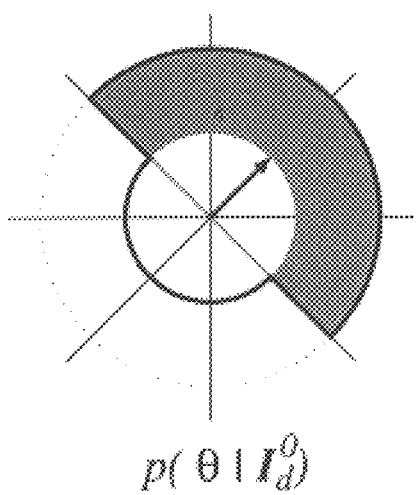
FIG. 1B is a diagram illustrating the a priori (i.e. "prior") conditional distribution $P(\theta|I_d^0)$ corresponding to the brightness constraint illustrated in FIG. 1A, in which all orientations in the shaded half-circle centered on the normal flow vector $v_n$ are equally likely.

The true spatio-temporal derivatives, denoted $I_d^0$, constrains the flow vector v to lie on the line described by $I_d^{0 \cdot v} = 0$, as shown in FIGS. 1A and 1B. In a probabilistic manner, $P(v|I_d)$ is defined as the probability of flow conditioned on the noisy image derivatives $I_d$. The error model for image derivatives is defined as:

$$I_d = I_d^0 + n \quad n \sim \text{Gaussian}(0, \Sigma) \quad (2)$$

where n is the error in the observation and is assumed to be Gaussian distributed with zero mean and some covariance $\Sigma$. To derive $P(v|I_d)$, Bayes rule is used to obtain:

$$P(v|I_d) = P(v|I_d^0) P(I_d^0|I_d) \quad (3)$$

Given an additive noise model, the conditional probability $P(I_d^0|I_d)$ is a Gaussian distribution with mean $I_d$ and covariance $\Sigma$. Hence, given a prior distribution of flow conditioned on the true image derivatives $P(v|I_d^0)$, the desired conditional probability $P(v|I_d)$ can be described.

While similar probabilistic methods have previously been used which describe the same conditional probability as Equation 3 (see Simoncelli et al., supra), the prior art methods differ from the present invention in two important ways. First, noise model of the prior art methods places the source of errors on the flow vectors instead of the image derivatives, which are known to be erroneous in the first place. Second, the prior art methods require them to choose a prior distribution on the flow vectors P(v). This prior is very hard to describe and changes with the type of motion, distribution of depths in the scene, and the like. Moreover, analytical tractability imposes a choice of zero-mean, Gaussian distribution for P(v) which is seldom realized in practice.

In contrast, in the present invention it is only necessary to choose the conditional distribution $P(v|I_d^0)$, the flow probability given the true image derivatives of a pixel. Thus, the prior used by the present invention is easier to motivate and does not require knowledge of the global motion patterns P(v). The selection of this prior and its impact on the solutions is discussed in the following section.

B. Probability Models for the Brightness Constraint

As can be observed from FIGS. 1A and 1B, the unknown component of the flow vector v lies on the CBA line and can be parameterized by an angle θ. This separates the space of possible values of θ into an acceptable (shaded) and an unacceptable zone. The acceptable zone is the half-circle centered on the normal flow vector $v_n$ associated with $I_d^0$. The requisite prior $P(v|I_d^0)$ can now be described as the conditional prior of θ.

In its weakest form, the prior on θ simply assumes that flow orientations in the acceptable zone are equally likely (see $P(\theta|I_d^0)$ in FIG. 1). The prior "kernel" is:

$$P(\theta | I_d^0) = \frac{1}{\pi} \text{ if } |\theta - \theta_n| \leq \frac{\pi}{2} \quad (4)$$
$$0 \text{ otherwise}$$

where $\theta_n$ is the orientation of the normal flow vector $v_n$. If desired, any specific knowledge of flow can be used to change the conditional distribution of flow orientations. As an example, for strictly bounded flow magnitude the range of acceptable angular deviations from $\theta_n$ can be reduced.

Since the true flow is fully determined by θ the choice of the conditional prior $P(\theta|I_d^0)$ automatically fixes the conditional prior $P(v|I_d^0)$. It can be shown that:

$$v = [\cos(\theta), \sin(\theta)] \|v_n\| \sec(74 - \theta_n) \quad (5)$$

where $v_n$ has a magnitude equal to $$\frac{\|I_t\|}{\|\nabla I\|}.$$

By combining Equations 3, 4 and 5, $P(v|I_d)$ can be expressed as a function of $P(I_d^0|I_d)$. However, this function does not have a simple analytic form. In practice it is preferably evaluated numerically.

Each pixel yields an image derivative $I_d$. Subsequently, a series of realizations is generated drawn from the distribution $P(I_d^0|I_d)$. For each realization, the prior kernel is accumulated on the desired distribution, $P(v|I_d)$. The conditional distribution of true flow $P(v|I_d)$ is the weighted average of different orientation kernels where the weights are determined by the conditional distribution $P(I_d^0|I_d)$.

To illustrate the probability distributions described above, FIG. 2 shows the normal flow and conditional flow distributions $P(v|I_d)$ for three image derivatives, [20, 20, 10], [10, 10, 5] and [4, 4, 2]. These derivatives correspond to the same normal flow vector of [−0.35, −0.35] observed in areas featuring different amounts of image texture. The error in image derivatives is modeled by a Gaussian distribution with a standard deviation of 1 in each of the spatio-temporal dimensions. For high levels of texture ($I_d$=[20, 20, 10]), the brightness constraint and the normal flow vector are reliable. Hence, the resulting normal flow distribution is very compact and the full flow distribution is uncertain only along the brightness constraint line. In the case of medium texture ($I_d$=[10, 10, 5]), the uncertainty in both the position of the normal flow vector and the full flow increases. When the amount of image texture is low ($I_d$=[4, 4, 2]), the degree of uncertainty in both the normal and full flow values increases significantly. This corresponds to the intuition that the reliability of the normal flow and the brightness constraint depends on the amount of image texture present in a local patch. In low texture areas this model does not penalize large deviations from the brightness constraint line.

Figure 2:
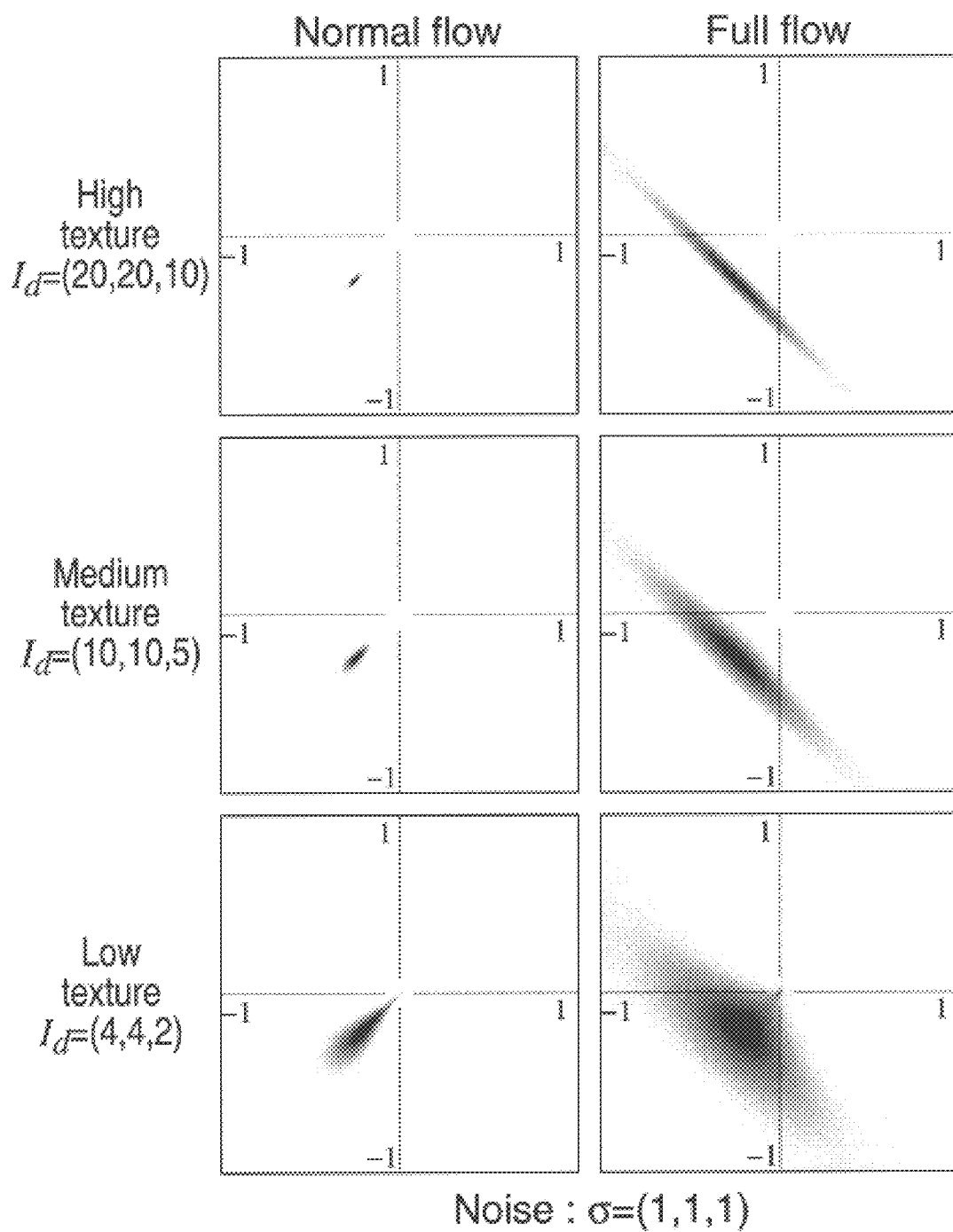
FIG. 2 depicts probability distributions of normal flow and optical flow for three different image derivatives having three different image derivatives representative of three different image textures (i.e. degrees of local image change)
Figure 3:
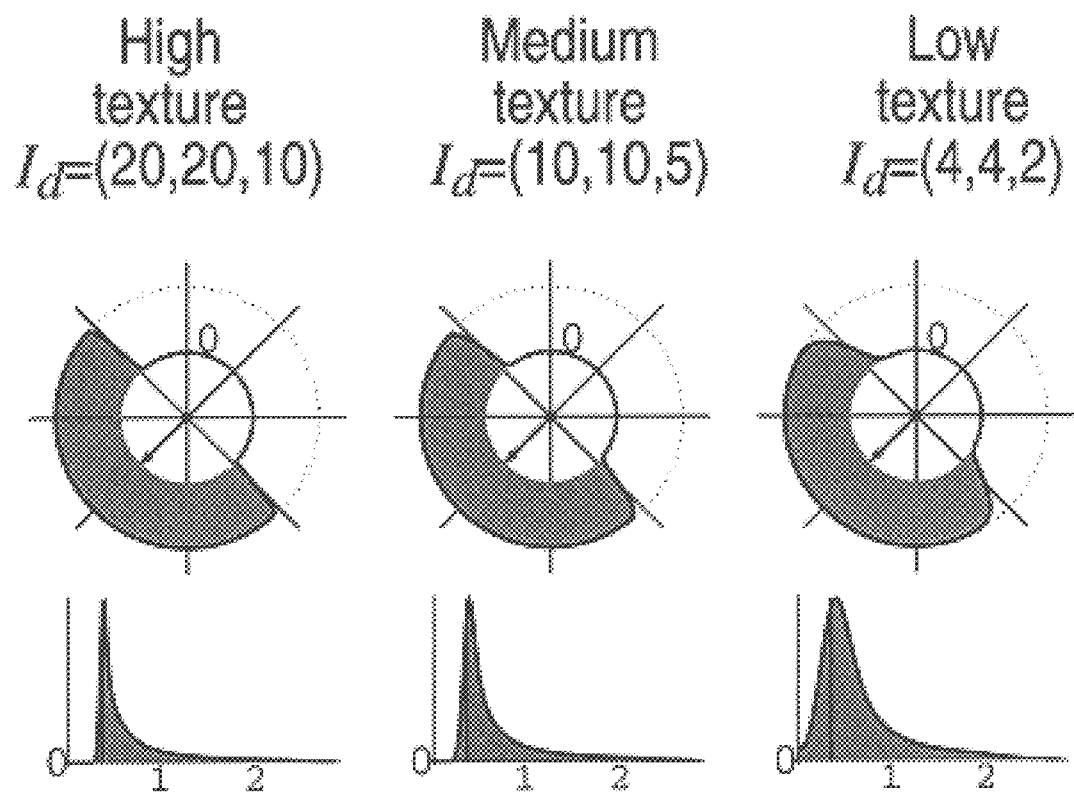
FIG. 3 depicts probability distributions of optical flow orientation and magnitude for three different image derivatives used in FIG. 2, in which each column illustrates the conditional distribution of flow orientation (top graph) and magnitude (bottom graph) for the noted image derivative.

FIG. 3 shows the distributions obtained for the flow orientation and magnitude using the same values of $I_d$ as in FIG. 2. As can be observed, the distribution of flow orientations is essentially invariant to the amount of texture available. However, the amount of texture significantly affects the probabilities of flow magnitudes. In the case of high texture, the normal flow is reliable, hence the full flow magnitude has to be greater than the normal flow magnitude (indicated by the vertical line). As the amount of texture decreases, the normal flow magnitude is less reliable, and the probability of flow magnitudes that are less than the normal flow magnitude increases. This confirms the intuition that unreliable normal flows should not overly restrict the range of full flow values. An extreme case would be when there is no discernible motion, i.e. $I_d$=[0, 0, 0]. In this case the simulated orientation distribution is uniform in the range [−π, π]. As a result, the orientation of such a pixel will be completely determined by the orientation of its neighbors, due to the imposed smoothness.

C. Solving for Optical Flow

Most prior art methods estimate optical flow by minimizing a cost function that trades off fidelity to the brightness constraint with a local smoothness assumption on the flow field. Due to depth discontinuities, the flow field is typically piecewise smooth (i.e. it contains smooth motion patches separated by large discontinuities). The enforcement of smoothness causes the flow estimate to smooth across these boundaries resulting in incorrect estimates of flow.

Generally, the resulting cost functions are minimized using iterative schemes for non-linear optimizations and are not guaranteed to converge to the global minimum. By formulating the flow estimation as a labeling problem for a restricted class of MRF models, iterative methods can be avoided and a globally optimal solution is guaranteed. The exact Maximum A Posteriori (MAP) estimate of this labeling problem can be obtained by a transformation into a maximum-flow problem on a graph. This global minimum tends to preserve large discontinuities.

The maximum-flow solution to the MAP estimate of the MRF requires the labels to be one-dimensional. Unfortunately, the flow at every pixel is described by a two dimensional vector. This forces us to parameterize the flow into two one-dimensional spaces. In the present invention, the two dimensional flow field $[v_x, v_y]$ is parameterized into a corresponding angle-magnitude representation [θ, m]. The preferred choice of this parameterization will be discussed in more detail below.

General MRF concepts are well-known in the art, and a thorough discussion of them may be found in a work by S. Li et al. entitled *Markov Random Field Modeling In Computer Vision,* Springer-Verlag publ. (1995). However, to motivate the formulation of the method of the present invention, the underlying concepts of MRF's will be described briefly here.

Given a set of sites (pixels) denoted by $S=\{0, \ldots, m-1\}$, a discrete labeling problem is one of assigning to each site a unique label (orientation or magnitude) drawn from a set of labels, $L=\{0, \ldots, M-1\}$. Each configuration of labels is drawn from a family of random variables $F=\{F_0, \ldots, F_{m-1}\}$. The Markovian property of an MRF is defined to be such that the probability of a site taking on a certain label $f_i$ is dependent only on its neighborhood. In general, this probability is hard to define but the Hammersley-Clifford theorem establishes that this probability can be related to a "clique potential" $V_c(f)$ through the Gibbs distribution. In other words:

$$P(F=f) \leftarrow e^{-U(f)} \qquad (6)$$

where $U(f) = \Sigma_{c_e c} V_c(f)$, that is, the clique potentials summed over all cliques. Cliques are considered over a local neighborhood N, which could be a 4-neighborhood of a pixel, for example (in which each pixel is considered to have only four neighboring pixels) or any other neighborhood function. In a Bayes formulation, it is desirable to maximize the posterior probability $P(F=f|X=x)$, where x is the observed data. Using Bayes rule:

$$P(F=f|X=x) \leftarrow P(X=x|F=f)P(F=f) \qquad (7)$$

Assuming that the noise is "iid" (identically and independently distributed), the likelihood term can be defined as:

$$P(X=x|F=f) = \prod_{i \in S}(X_i = x_i | F_i = f_i) \qquad (8)$$

where the product is over all sites (i.e. all pixels). In summary, the MAP estimate can be rewritten as an energy minimization problem where the energy is:

$$E(f) = \sum_{i \in S} \sum_{i' \in N_i} V(f_i, f_{i'}) - \sum_{i \in S} \ln(P(X_i = x_i | F_i = f_i)) \qquad (9)$$

which contains a contribution from the label configuration and a contribution from the resulting clique potentials. Typically, the clique potentials reflect prior knowledge of the problem and in the case of optical flow they are used to impose smoothness on the estimated flow field.

As discussed above, the present invention solves the labeling problem using a non-iterative, global minimization method. This is achieved by expressing $E(f)$ as a flow graph on which a maximum-flow computation is performed. The average computational complexity was experimentally measured to be $O(n^{1.15} d^{1.31})$ where n is the image size and d the number of labels. In this context, the clique potential V( ) is required to be linear, yielding a smoothness term of the form:

where β is a proportionality constant that controls the amount of smoothness desired in the solution.

1. Maxflow Solution for Optical Flow

As stated in the previous section, the cost function to be minimized using maximum-flow computation is:

$$E(f) = \sum_{i \in S} \sum_{i' \in N_i} \beta(f_i, f_{i'}) - \sum_{i \in S} \ln(P(X_i = x_i | F_i = f_i)) \qquad (11)$$

Details of the maxflow formulation and the MRF interpretation are known and may be found in the '834 Application and the articles by Roy et al. and Ishiwaka et al., supra. The guarantee of global optimality of the minimum cost cut associated to the MAP estimate is also known and is discussed by Boykov et al., supra, as well as by Ishikawa et al., supra.

As mentioned earlier, the parameterization of the flow field in the present invention is the (θ, m) representation. To solve for the flow, the conditional probabilities $P(\theta|I_d)$ are computed as described in Section B above by simply factorizing the flow velocity distribution $P(v|I_d)$ into its angle and magnitude components $P(\theta|I_d)$ and $P(m|I_d)$, respectively. In order to solve for the orientation flow field θ (denoting the configuration of orientation for all pixels), Equation 11 now takes the form:

$$\min_\theta \sum_{i \in S} \sum_{i' \in N_i} \beta_1 |\theta_i - \theta_{i'}| - \sum_{i \in S} \ln(P(\theta | I_{di})) \qquad (12)$$

It may be noted that since the MRF scheme uses a finite number of labels, the range of values of $\theta=[-\pi, \pi]$ needs to be discretised into a finite number of steps. In experiments using the present invention, step sizes between 1° and 4° were used. Although it might appear that discretizing the pixel motion will generate large errors compared to a non-discrete representation, these experiments have shown that this is not the case.

Having solved for the flow orientation, it is next necessary to solve for the magnitude m for each pixel. The magnitude may be solved in the same way as the flow orientation was solved. However, in practice, computing the magnitude is much more difficult than the orientation of the flow. Preferably, the conditional distribution $P(m|I_d)$ is modified by taking advantage of the extra information provided by the computed orientation estimate. This results in $P(m|\theta_s, I_d)$ where $\theta_s$ is the solution for the orientation of a pixel. Thus, the cost function for computing motion magnitude becomes:

$$\min_m \sum_{i \in S} \sum_{i' \in N_i} \beta_2 |m_i - m_{i'}| - \sum_{i \in S} \ln(P(m | \theta_{si}, I_{di})) \qquad (13)$$

It should be noted that β in Equations 12 and 13 are represented as $\beta_1$ and $\beta_2$, respectively, to indicate that the particular value of β is arbitrary and may be the same in both equations for both motion orientation and motion magnitude or the values of may be different in the two equations for motion orientation and motion magnitude.

The above modification is found to dramatically improve performance. This can be explained by the fact that the orientation estimate restricts the full flow to a line thereby reducing the uncertainty of the magnitude distribution. In other words, this new conditional distribution $P(m|\theta_x, I_d)$ is much more representative of the true flow magnitude since the ambiguity along the brightness constraint has been removed. By combining the two estimates (i.e. θ and m), the optical flow between the two images is obtained.

Figure 4:
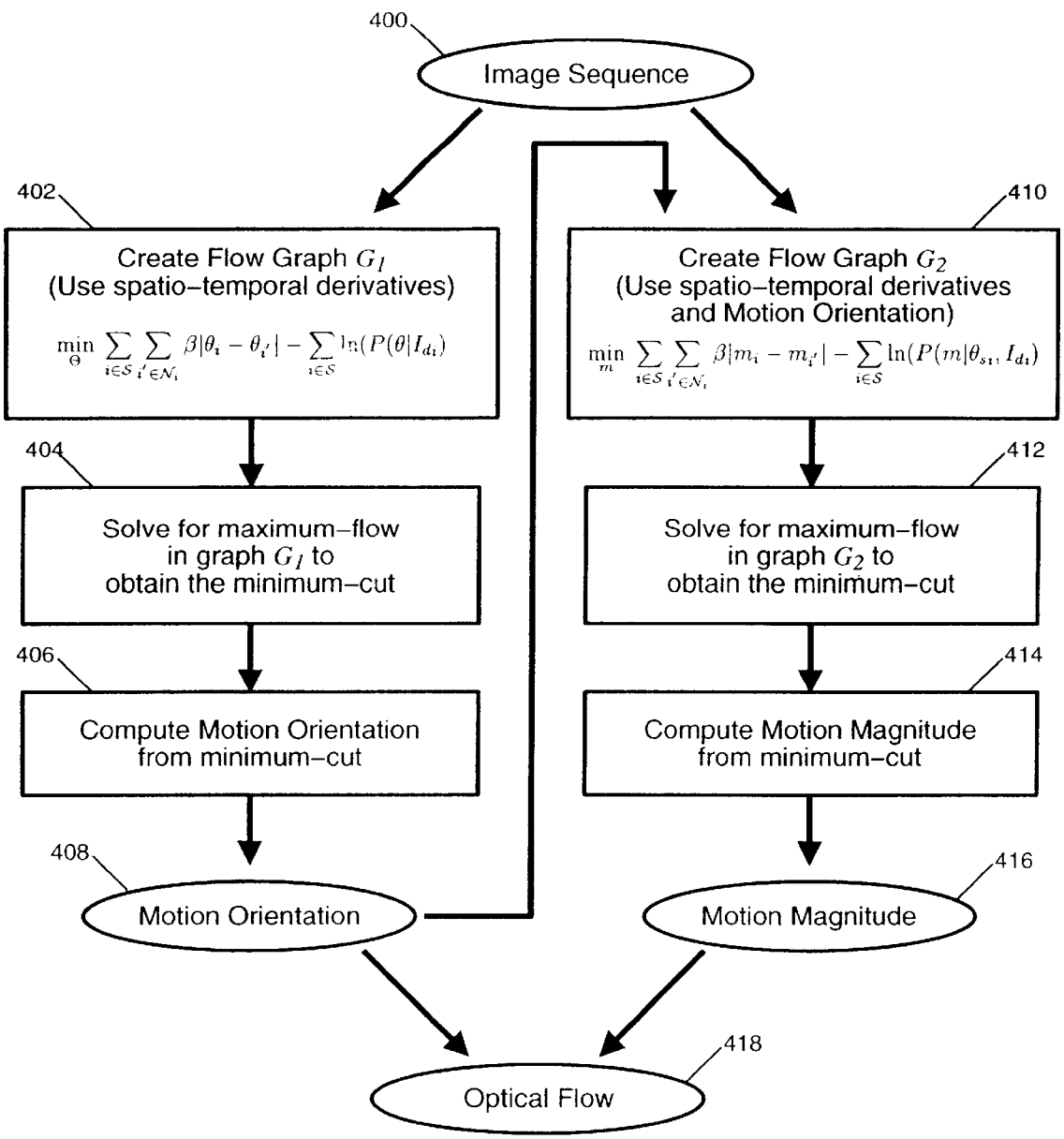
FIG. 4 is a flow diagram which depicts the overall method of the present invention.

With reference now to FIG. 4, there is shown a flow diagram which depicts the overall method of the present invention. An image sequence 400 is provided as an input to the method. Image sequence 400 is typically a video sequence of at least seven images, but can be any plurality of images sufficiently temporally dense to allow computation of image derivatives. Image sequence 400 is used as an input to two phases of the method of the present invention: a first phase in which the motion orientation is estimated (402, 404, 406, and 408) and a second phase in which the motion magnitude is estimated (410, 412, 414, and 416). The motion orientation phase is typically performed first because the motion orientation result is also provided as an input the motion magnitude phase.

In the motion orientation phase, a first flow graph $G_1$ is created in step 402. First flow graph $G_1$ is created using spatio-temporal derivatives (Equation 1) of the images, and a cost function is created (Equation 12) whose minimum yields the orientation component of the motion. The graph is constructed in the same fashion as in the '834 Application, but using the cost function of Equation 12 to derive the edge-capacity function (occ(u, v)=$\beta$, and reg(u, v)=$-\ln(P(\theta|I_{di}))$). Next, in step 404, the method solves for the maximum-flow in first graph $G_1$ and extracts the minimum-cut from the first graph $G_1$ in the same manner as set forth in the '834 Application. In step 406, the motion orientation is computed from the minimum-cut. The orientations $\theta_i$ (for all pixels i∈S) are given directly by the "label" edges in the minimum-cut. The result is the motion orientation 408, which is the direction of motion and thus represents one component of the optical flow.

In the motion magnitude phase, a second flow graph $G_2$ is created in step 410. Second flow graph $G_2$ is created using spatio-temporal derivatives (Equation 1) of the images as well as the previously computed pixel motion orientation 408. A cost function is created (Equation 13) whose minimum yields the magnitude component of the motion when applied to $P(m|\theta, I_d)$. The graph is constructed in the same fashion as in the '834 Application, but using this cost function to derive the edge-capacity function (occ(u, v)=$\beta$, and reg(u, v)=$-\ln(P(m|\theta_{si}, I_{di}))$). Next, in step 412, the method solves for the maximum-flow in second graph $G_2$ and extracts the minimum-cut from the second graph $G_2$ in the same manner as set forth in the '834 Application. In step 414, the motion magnitude is computed from the minimum-cut. The magnitudes $m_i$ (for all pixels i∈S) are given directly by the "label" edges in the minimum-cut. The result is the motion magnitude 416, which is the magnitude of motion and thus represents another component of the optical flow.

The optical flow 418 is the combination of the motion orientation component 408 and the motion magnitude component 416, resulting in the full optical flow field.

2. Parameterization of Two-Dimensional Flow

As mentioned earlier, the optical flow is parameterized into two one-dimensional representations. It is desirable that these two parameters are as independent of each other as possible (i.e. $P(v|I_d)=P(a(v)|I_d) P(b(v)|I_d)$), where a(v) and b(v) are the new one-dimensional parameters representing flow). Two alternatives have been considered: the angle-magnitude representation ($\theta$, m), and the velocity components ($v_x$, $v_y$). To determine the best representation, the cross-correlation coefficient was experimentally measured. For a large number of typical image derivatives (500 experiments), the corresponding conditional distributions $P(v|I_d)$ were generated and computed the cross-correlation coefficients for the two different parameterizations. The cross-correlation coefficient $\rho$ is defined as:

$$\rho = \frac{E[(a-\mu_a)(b-\mu_b)]}{\sqrt{E[(a-\mu_a)^2(b-\mu_b)^2]}} \quad (14)$$

where E is expectation, $\mu$ is mean, and (a, b) is either ($\theta$, m) or ($v_x$, $v_y$). The average value of $\rho$ was found to be 0.04 for the ($\theta$, m) representation and 0.4 for the ($v_x$, $v_y$) representation. Clearly the ($\theta$, m) representation is almost independent while the ($v_x$, $v_y$) representation is not. Therefore, the choice of the angle-magnitude parameterization is appropriate.

D. Results

In this section, the performance of the method of the present invention is evaluated by using it on synthetic and real data sets from an article on evaluation by Barron et al. entitled "Performance Of Optical Flow Techniques," *Int'l Journal of Computer Vision*, Vol. 2, No. 1, pp. 43–77 (1994), as well as comparing the results for the present invention with those of various methods also mentioned in that article.

In the implementation used to test the present invention, the computation of image derivatives consists of applying a spatio-temporal Gaussian filter ($\sigma$=1.5) followed by a 4-point difference operator (1/12) [−1, 8, 0,]. The modified Horn and Schunk algorithm in Barron et al., supra, uses the same derivative computation. Run time for most experiments range between a few seconds for small images and up to ten minutes on large images on a fast workstation. These run times can be easily reduced by using a coarser discretization of the motion parameters without significantly affecting the solutions. All results presented in this section are the raw flow fields obtained by the method of the present invention without applying any post-processing.

1. Synthetic Images

Figure 5:
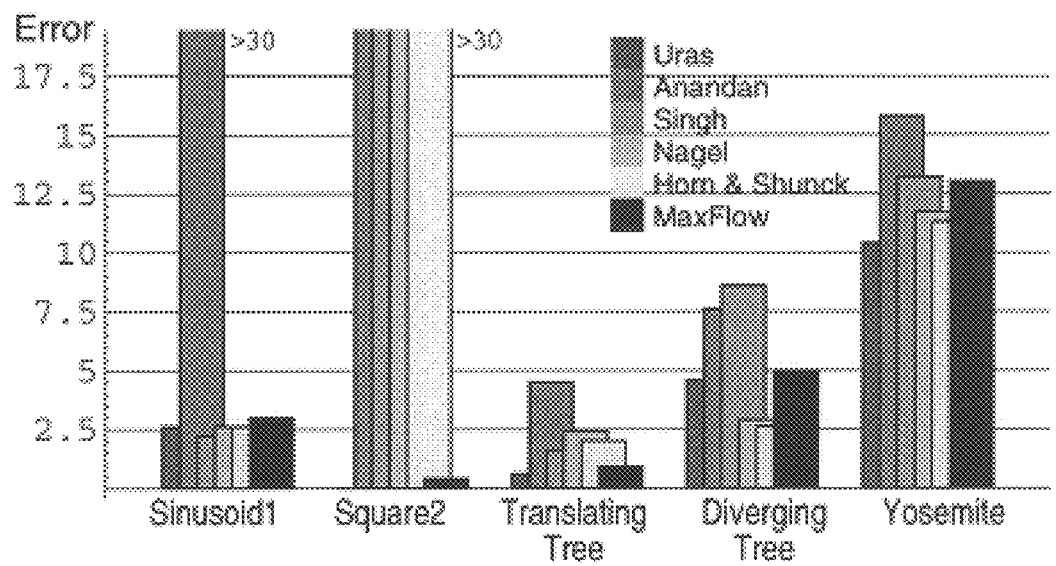
FIG. 5 is a bar graph illustrating the results of various test algorithms for various synthetic data sets as compared to the results for the method of the present invention, in which the results of the present invention are labeled "MaxFlow"

The optical flow estimation method of the present invention was run on 5 synthetic sequences of Barron et al., for which ground truth was provided. Results were compared with those of the five algorithms in Barron et al. that yield 100% flow field density. Non-dense methods are not directly compared since the present invention is specifically designed to estimate dense flow fields and cannot be readily modified to yield sparse fields. The error measure is the same as the one used in Barron et al. For two motions [$u_0$, $v_0$] and [$u_1$, $v_1$], the error measure is defined as the angle between the two vectors [$u_0$, $v_0$, 1] and [$u_1$, $v_1$, 1]. The results are summarized in FIG. 5. The performance of the present invention on these data sets is consistently good. However, these data sets all feature very smooth motion fields which do not reveal the behavior of algorithms near motion discontinuities. Also, they contain no noise or other pixel inconsistencies. Those are important aspects of optical flow computation on real images, which are handled especially well by the present invention. The most striking result is for "Square2," where the method of the present invention outperforms all other methods by orders of magnitude. This is a case where very sparse derivative information is available and therefore demonstrates the advantage of enforcing smoothness globally rather than locally. It will be noticed that the present invention performs consistently better than the correlation-based algorithms (e.g. Anandan, supra; Singh, supra) and never much worse than any other method.

2. Real Images

To demonstrate the performance of the present invention under realistic conditions, the flow for four real images (see FIGS. 6A, 7A, 8A and 9A). These are the familiar Rubic Cube (FIG. 6A), NASA Sequence (FIG. 7A), Hamburg Taxi (FIG. 8A), SRI-Trees (FIG. 9A), and are also discussed in the Barron et al. article, supra. Since no ground truth is available, only qualitative results are displayed.

Figure 6A:
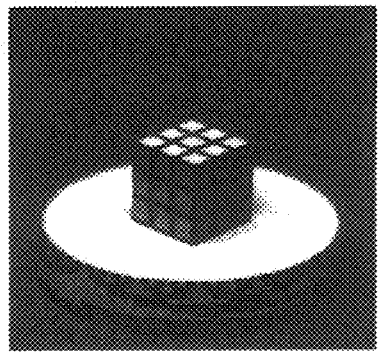
FIG. 6A is one image in a sequence of images of a cube rotating on a turntable used to test the present invention.
Figure 6B:
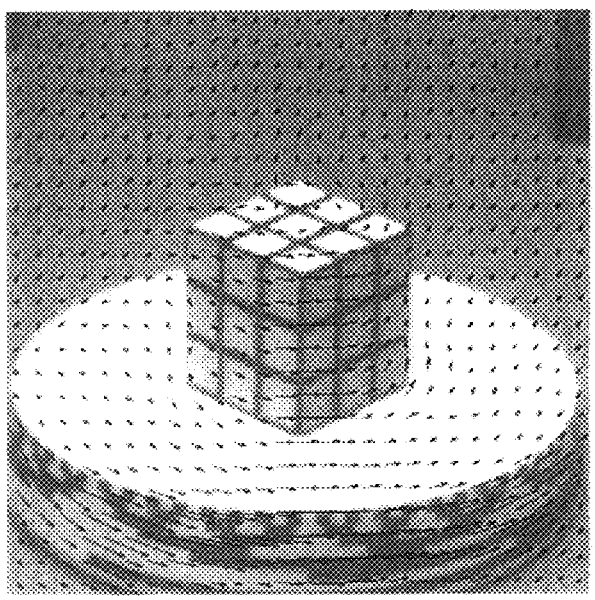
FIG. 6B illustrates the optical flow field estimated by the method of the present invention using the image sequence including the image of FIG. 6A.
Figure 6C:
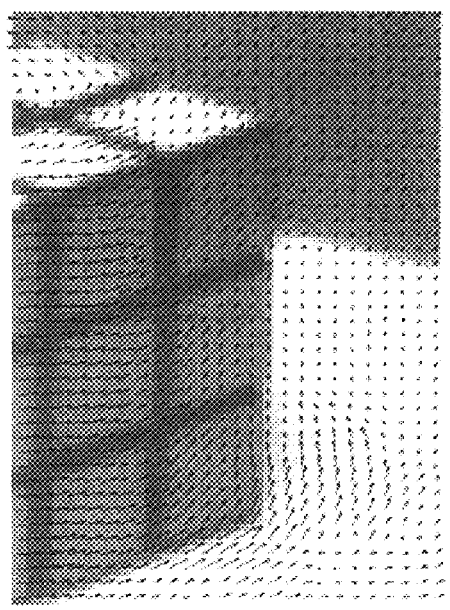
FIG. 6C is a zoomed view of the optical flow field illustrated in FIG. 6B, in which the three different types of motion present (the motion of the cube, the turntable and the background) are accurately recovered.

The estimated flow field for the Rubic Cube is displayed in FIG. 6B. This data set features a cube rotating on a turntable. It will be observed that the flow closely follows the motion of the turntable and the cube in both orientation and magnitude. The flow is well propagated over textureless regions like the top of the turn table. Moreover, motion discontinuities are well preserved. A closer look at the flow field is provided in FIG. 6C.

Figure 7A:
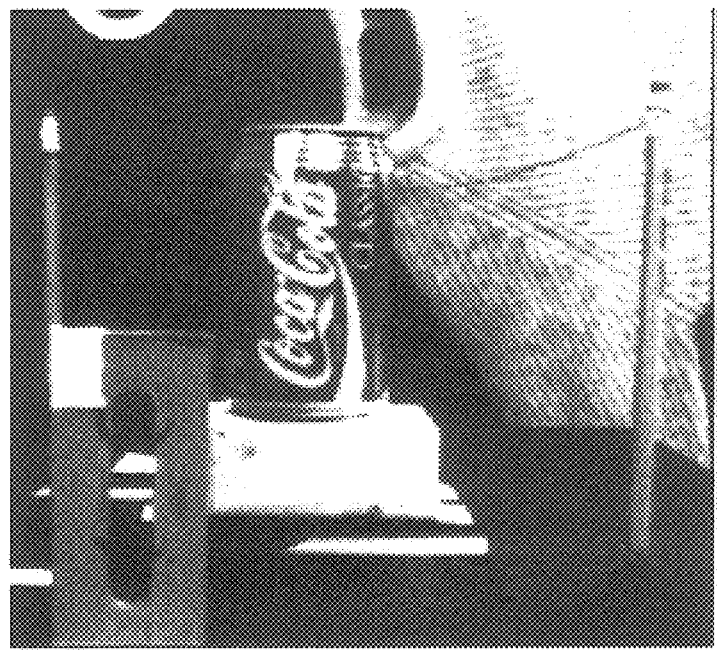
FIG. 7A is one image in a sequence of images of a soda can and assorted objects, wherein the camera zooms in, used to test the present invention.
Figure 7B:
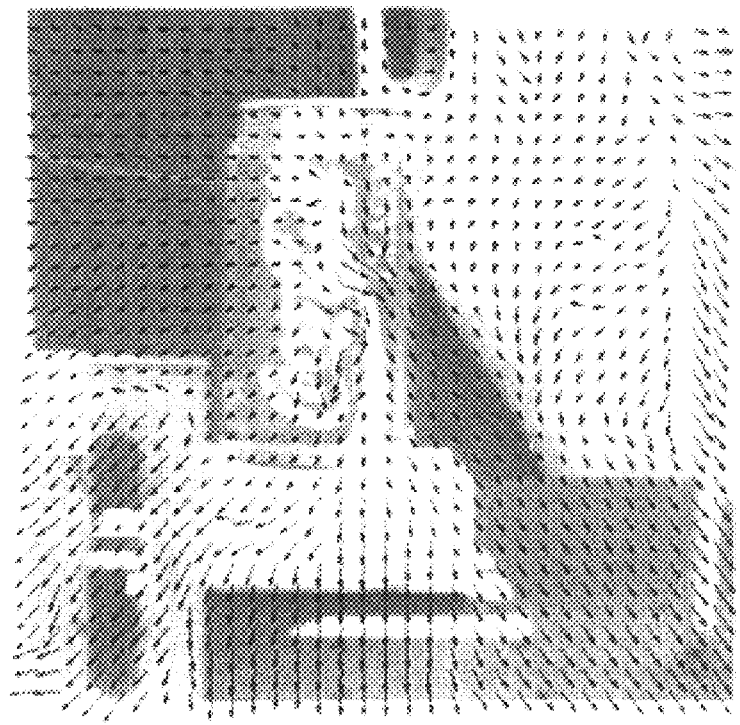
FIG. 7B illustrates the optical flow field estimated by the method of the present invention using the image sequence including the image of FIG. 7A.

The NASA Sequence features a divergent flow field induced by a camera zoom. The magnitudes of the motion are very small, typically much less than one pixel. As illustrated in FIG. 7B, the divergence of the flow is well recovered. Notice errors in the middle of the soda can are mostly induced by specularities coupled with low motion.

Figure 8A:
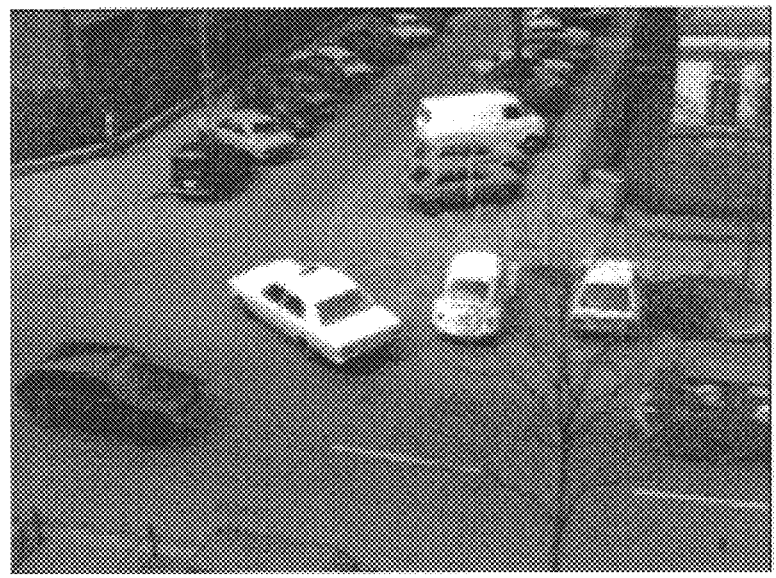
FIG. 8A is one image in a sequence of images of multiple vehicles moving independently used to test the present invention.
Figure 8B:
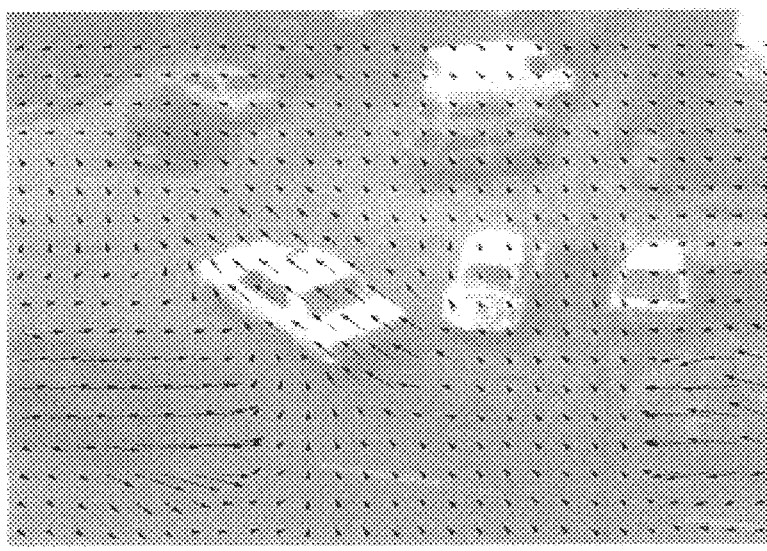
FIG. 8B illustrates the optical flow field estimated by the method of the present invention using the image sequence including the image of FIG. 8A.

The Hamburg Taxi sequence is an example of multiple independent motions. Three vehicles are moving independently across the sequence. The resulting flow is shown in FIG. 8B. The motions of the vehicles are well recovered and well localized, making it possible to segment the motions by using a simple thresholding of the motion magnitudes. This is an example where accurate recovery of motion discontinuities is critical.

Figure 9A:
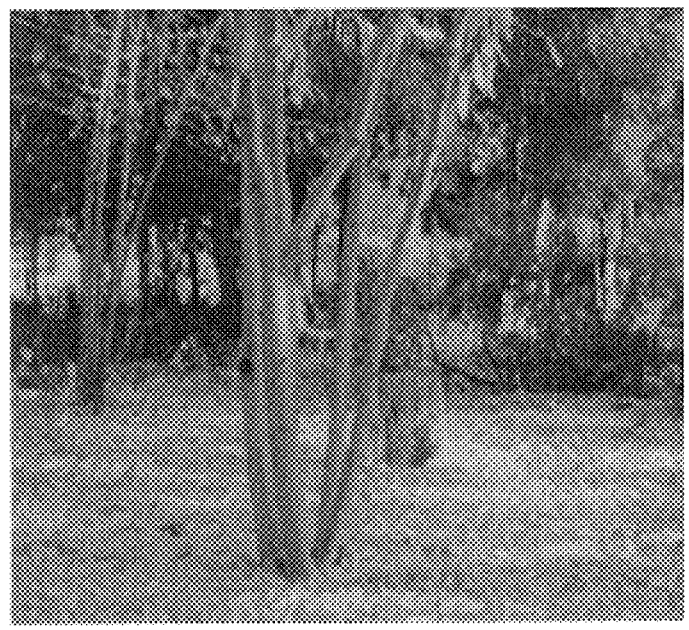
FIG. 9A is one image in a sequence of images of trees, wherein the camera horizontally translates across the image, used to test the present invention.
Figure 9B:
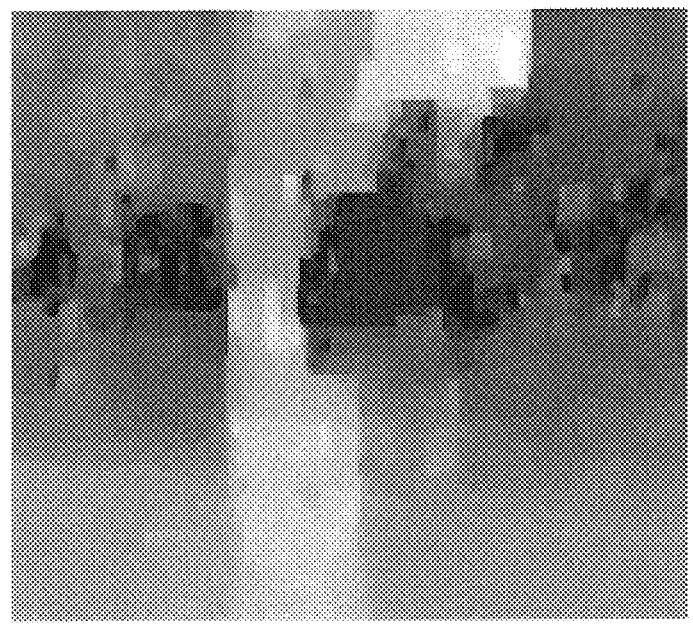
FIG. 9B is a depth map illustrating the optical flow field estimated by the method of the present invention using the image sequence including the image of FIG. 9A.

The SRI-Tree sequence features a horizontally translating camera. It features large amounts of occlusions and low contrast. Because of the unusual camera motion, the magnitude of the motion is equivalent to the scene depth. Therefore, the result in FIG. 9B is displayed as a depth map. Dark regions represent small motions (large depths) and light regions represent large motions (small depths). The result is very close to those obtained by dedicated stereo algorithms that utilize the knowledge of camera motion and hence are expected to perform well. Depth discontinuities are well recovered as can be seen along the tree trunks in the middle of the image. On the other hand, notice that the planarity of the ground surface is well preserved. This demonstrates that it is possible to both enforce high degrees of smoothness and recover sharp discontinuities.

Accordingly, a new method for estimating optical flow in a probabilistic framework is provided. The inherent inaccuracy of image derivatives is explicitly accounted for using a simple noise model which in turn results in a probabilistic model of the full flow. By separating the flow into its angle-magnitude components, the full flow is computed in two steps, each based on a MAP estimate of an MRF with linear clique potentials. These estimates are optimal and obtained efficiently through a maximum-flow computation over a graph. The recovered flow fields are dense and retains sharp motion discontinuities. It is believed that careful probabilistic modeling can achieve high levels of robustness to the significant errors inherent to the problem of optical flow estimation.

While there has been described and illustrated methods for estimating optical flow for use in certain applications, it will be apparent to those skilled in the art that variations and modifications are possible without deviating from the spirit and broad teachings of the invention which shall be limited solely by the scope of the claims appended hereto.

What is claimed is:

1. A method for estimating the optical flow between a plurality of images, the method comprising the steps of:
    (a) obtaining a motion orientation component, including the steps of:
        creating a first graph $G_1$ using spatio-temporal derivatives of the plurality of images;
        solving for a first maximum-flow in first graph $G_1$ to thereby obtain a first minimum-cut therefrom; and
        computing the motion orientation component from the first minimum-cut;
    (b) obtaining a motion magnitude component, including the steps of:
        creating a second graph $G_2$ using spatio-temporal derivatives of the plurality of images and the motion orientation component;
        solving for a second maximum-flow in second graph $G_2$ to thereby obtain a second minimum-cut therefrom; and
        computing the motion magnitude component from the second minimum-cut;
    whereby the motion orientation component and the motion magnitude component together comprise the estimate of the optical flow between the plurality of images.

2. The method of claim 1, wherein the first graph $G_1$ is created by deriving an edge capacity function from a cost function of:

$$\min_\theta \sum_{i \in S} \sum_{i' \in N_i} \beta_1 |\theta_i - \theta_{i'}| - \sum_{i \in S} \ln(P(\theta | I_{di}))$$

wherein S is a set of all pixels, $N_i$ is a set of all pixels that are in a neighborhood of pixel i, $\beta_1$ is an arbitrary, nonnegative smoothness constant, $\theta_i$ is orientation of pixel i, $I_d$ is a measured image derivative, and $P(\theta|I_{di})$ is the conditional probability of an orientation $\theta$ given an image derivative $I_{di}$.

3. The method of claim 2, wherein the neighborhood is a 4-neighborhood.

4. The method of claim 2, wherein the conditional probability distribution $P(\theta|I_d)$ is $[P(\theta|I_d^O) \cdot P(I_d^O|I_d)]$, wherein $P(\theta|I_d^O)$ is a model of motion orientation and $P(I_d^O|I_d)$ is a model of error in measurement of the image derivatives, and wherein:

$$P(I_d^O|I_d) = \text{Gaussian}(0, \Sigma)$$

and $$P(\theta|I_d^O) = \frac{1}{\pi} \text{ if } |\theta - \theta_n| \leq \frac{\pi}{2}.$$
$$0 \text{ otherwise}$$

5. The method of claim 2, wherein the second graph $G_2$ is created by deriving an edge capacity function from a cost function of:

$$\min_m \sum_{i \in S} \sum_{i' \in N_i} \beta_2 |m_i - m_{i'}| - \sum_{i \in S} \ln(P(m|\theta_{si}, I_{di}))$$

wherein S is a set of all pixels, $N_i$ is a set of all pixels that are in a neighborhood of pixel i, $\beta_2$ is an arbitrary, nonnegative smoothness constant, $m_i$ is magnitude of pixel i, $I_d$ is a measured image derivative, and $P(m|\theta_{si}, I_{di})$ is the conditional probability of a magnitude m given a known orientation $\theta_{si}$ and an image derivative $I_{di}$.

6. The method of claim 5, wherein a conditional probability distribution $P(m|\theta_{si}, I_{di})$ is derived from combining the conditional probability distribution $P(\theta|I_{di})$ and a constant brightness assumption.

7. The method of claim 1, wherein the second graph $G_2$ is created by deriving an edge capacity function from a cost function of:

$$\min_{m} \sum_{i \in S} \sum_{i' \in N_i} \beta_2 |m_i - m_{i'}| - \sum_{i \in S} \ln(P(m|\theta_{si}, I_{di}))$$

wherein S is a set of all pixels, $N_i$ is a set of all pixels that are in a neighborhood of pixel i, $\beta_2$ is an arbitrary, nonnegative smoothness constant, $m_i$ is magnitude of pixel i, $I_d$ is a measured image derivative, and $P(m|\theta_{si}, I_{di})$ is the conditional probability of a magnitude m given a known orientation $\theta_{si}$ and an image derivative $I_{di}$.

8. The method of claim 7, wherein the neighborhood is a 4-neighborhood.

9. A method for estimating the optical flow between a plurality of images, the method comprising the steps of:
(a) obtaining a motion orientation component, including the steps of:
creating a first graph $G_1$ using spatio-temporal derivatives of the plurality of images by deriving an edge capacity function from a cost function of:

$$\min_{\theta} \sum_{i \in S} \sum_{i' \in N_i} \beta_1 |\theta_i - \theta_{i'}| - \sum_{i \in S} \ln(P(\theta|I_{di}))$$

wherein S is a set of all pixels, $N_i$ is a set of all pixels that are in a neighborhood of pixel i, $\beta_1$ is an arbitrary, nonnegative smoothness constant, $\theta_i$ is orientation of pixel i, $I_d$ is a measured image derivative, and $P(\theta|I_d)$ is the conditional probability of an orientation θ given an image derivative $I_{di}$;
solving for a first maximum-flow in first graph $G_1$ to thereby obtain a first minimum-cut therefrom; and
computing the motion orientation component from the first minimum-cut;
(b) obtaining a motion magnitude component, including the steps of:
creating a second graph $G_2$ using spatio-temporal derivatives of the plurality of images and the motion orientation component;
solving for a second maximum-flow in second graph $G_2$ to thereby obtain a second minimum-cut therefrom; and
computing the motion magnitude component from the second minimum-cut;
whereby the motion orientation component and the motion magnitude component together comprise the estimate of the optical flow between the plurality of images.

10. The method of claim 9, wherein the neighborhood is a 4-neighborhood.

11. The method of claim 9, wherein the conditional probability distribution $P(\theta|I_{di})$ is $[P(\theta|I_d^o) \cdot P(I_d^o|I_d)]$, wherein $P(\theta|I_d^o)$ is a model of motion orientation and $P(I_d^o|I_d)$ is a model of error in measurement of the image derivatives, and wherein:

$P(I_d^o|I_d) =$ Gaussian$(0, \Sigma)$ and $$P(\theta|I_d^o) = \frac{1}{\pi} \text{ if } |\theta - \theta_n| \leq \frac{\pi}{2},$$
0 otherwise 12. The method of claim 9, wherein the second graph $G_2$ is created by deriving an edge capacity function from a cost function of:

$$\min_{m} \sum_{i \in S} \sum_{i' \in N_i} \beta_2 |m_i - m_{i'}| - \sum_{i \in S} \ln(P(m|\theta_{si}, I_{di}))$$

wherein S is a set of all pixels, $N_i$ is a set of all pixels that are in a neighborhood of pixel i, $\beta_2$ is an arbitrary, nonnegative smoothness constant, $m_i$ is magnitude of pixel i, $I_d$ is a measured image derivative, and $P(m|\theta_{si}, I_{di})$ is the conditional probability of a magnitude m given a known orientation $\theta_{si}$ and an image derivative $I_{di}$.

13. The method of claim 12, wherein a conditional probability distribution $P(m|\theta_{si}, I_{di})$ is derived from combining the conditional probability distribution $P(\theta|I_{di})$ and a constant brightness assumption.

14. A method for estimating the optical flow between a plurality of images, the method comprising the steps of:
(a) obtaining a motion orientation component, including the steps of:
creating a first graph $G_1$ using spatio-temporal derivatives of the plurality of images;
solving for a first maximum-flow in first graph $G_1$ to thereby obtain a first minimum-cut therefrom; and
computing the motion orientation component from the first minimum-cut;
(b) obtaining a motion magnitude component, including the steps of:
creating a second graph $G_2$ using spatio-temporal derivatives of the plurality of images and the motion orientation component by deriving an edge capacity function from a cost function of:

$$\min_{m} \sum_{i \in S} \sum_{i' \in N_i} \beta_2 |m_i - m_{i'}| - \sum_{i \in S} \ln(P(m|\theta_{si}, I_{di}))$$

wherein S is a set of all pixels, $N_i$ is a set of all pixels that are in a neighborhood of pixel i, $\beta_2$ is an arbitrary, nonnegative smoothness constant, $m_i$ is magnitude of pixel i, $I_d$ is a measured image derivative, and $P(m|\theta_{si}, I_{di})$ is the conditional probability of a magnitude m given a known orientation $\theta_{si}$ and an image derivative $I_{di}$;
solving for a second maximum-flow in second graph $G_2$ to thereby obtain a second minimum-cut therefrom; and
computing the motion magnitude component from the second minimum-cut;
whereby the motion orientation component and the motion magnitude component together comprise the estimate of the optical flow between the plurality of images.

15. The method of claim 14, wherein the neighborhood is a 4-neighborhood.

* * * * *